United States Patent
Archambault et al.

(10) Patent No.: US 10,374,704 B2
(45) Date of Patent: Aug. 6, 2019

(54) RAMAN AMPLIFIER SYSTEM AND METHOD WITH INTEGRATED OPTICAL TIME DOMAIN REFLECTOMETER

(71) Applicant: Ciena Corporation, Hanover, MD (US)

(72) Inventors: Jean-Luc Archambault, Ottawa (CA); Jun Bao, Ellicott City, MD (US); Balakrishnan Sridhar, Ellicott City, MD (US)

(73) Assignee: Ciena Corporation, Hanover, MD (US)

( * ) Notice: Subject to any disclaimer, the term of this patent is extended or adjusted under 35 U.S.C. 154(b) by 15 days.

(21) Appl. No.: 15/705,834

(22) Filed: Sep. 15, 2017

(65) Prior Publication Data

US 2018/0019813 A1    Jan. 18, 2018

Related U.S. Application Data

(63) Continuation of application No. 14/845,351, filed on Sep. 4, 2015, now Pat. No. 9,793,986, which is a
(Continued)

(51) Int. Cl.
*H01S 3/30* (2006.01)
*H04Q 9/00* (2006.01)
(Continued)

(52) U.S. Cl.
CPC ....... *H04B 10/0797* (2013.01); *G01M 11/319* (2013.01); *G01M 11/3109* (2013.01);
(Continued)

(58) Field of Classification Search
CPC .. H04B 10/079; H04B 10/073; H04B 10/291; H04B 10/071; H04B 10/0797;
(Continued)

(56) References Cited

U.S. PATENT DOCUMENTS

| 5,504,617 A * | 4/1996 | Spirit | H04B 10/071 |
| | | | 359/341.43 |
| 5,633,741 A * | 5/1997 | Giles | H04B 10/2912 |
| | | | 359/337.21 |

(Continued)

OTHER PUBLICATIONS

Pilhan Kim, Jaehyoung Park, Hosung Yoon, Jonghan Park, and Namkyoo Park; "In Situ Design Method for Multichannel Gain of a Distributed Raman Amplifier With Multiwave OTDR"; IEEE Photonics Technology Letters, vol. 14, No. 12, Dec. 2002—(C) 2002 IEEE.

(Continued)

*Primary Examiner* — Abbas H Alagheband
(74) *Attorney, Agent, or Firm* — Clements Bernard Walker PLLC; Christopher L. Bernard; Lawrence A. Baratta, Jr.

(57) ABSTRACT

An optical module includes an optical amplifier configured to amplify Wavelength Division Multiplexing (WDM) channels transmitted on a fiber; and an optical time domain reflectometer (OTDR) configured to transmit an OTDR signal on the fiber and detect a back-scattered signal based thereon to test the fiber, wherein a wavelength of the OTDR signal is one of i) between one or more wavelengths associated with the optical amplifier and one or more wavelengths associated with the WDM channels and ii) greater than the one or more wavelengths associated with the WDM channels, for in-service operation of the OTDR.

17 Claims, 5 Drawing Sheets

Related U.S. Application Data continuation of application No. 13/622,481, filed on Sep. 19, 2012, now Pat. No. 9,148,710.

(51) Int. Cl.

| | | |
|---|---|---|
| *H01S 3/094* | (2006.01) | |
| *H01S 3/131* | (2006.01) | |
| *H04J 14/02* | (2006.01) | |
| *H04B 10/071* | (2013.01) | |
| *H04B 10/073* | (2013.01) | |
| *H04B 10/079* | (2013.01) | |
| *H04B 10/291* | (2013.01) | |
| *G01M 11/00* | (2006.01) | |

(52) U.S. Cl.
CPC ........... *H01S 3/302* (2013.01); *H04B 10/071* (2013.01); *H04B 10/0731* (2013.01); *H04B 10/2916* (2013.01); *H04J 14/0227* (2013.01); *H04Q 9/00* (2013.01); *G01M 11/3136* (2013.01); *H01S 3/094042* (2013.01); *H01S 3/094046* (2013.01); *H01S 3/1312* (2013.01)

(58) Field of Classification Search
CPC . H04B 10/0731; H04B 10/2916; H04J 14/02; H04J 14/0227; G01M 11/00; G01M 11/319; G01M 11/3109; G01M 11/3136; H04Q 9/00; H01S 3/094; H01S 3/30; H01S 3/131; H01S 3/094046; H01S 3/302; H01S 3/1312; H01S 3/094042
USPC ........................................................ 398/28
See application file for complete search history.

(56) References Cited

U.S. PATENT DOCUMENTS

| | | | | |
|---|---|---|---|---|
| 5,724,126 | A * | 3/1998 | Nishi | G01M 11/3181 356/73.1 |
| 6,005,694 | A * | 12/1999 | Liu | H04B 10/071 398/20 |
| 6,009,220 | A * | 12/1999 | Chan | H04B 10/071 385/24 |
| 6,519,026 | B1 * | 2/2003 | Holland | G01M 11/3109 356/73.1 |
| 6,519,082 | B2 | 2/2003 | Ghera et al. | |
| 6,624,927 | B1 * | 9/2003 | Wong | H01S 3/094003 359/334 |
| 6,671,083 | B2 * | 12/2003 | Tanaka | H01S 3/302 359/334 |
| 6,738,132 | B2 * | 5/2004 | Sobe | G01M 11/3145 356/73.1 |
| 6,876,488 | B1 * | 4/2005 | Akasaka | H04B 10/2525 359/334 |
| 7,088,436 | B2 | 8/2006 | Saunders et al. | |
| 7,215,415 | B2 * | 5/2007 | Maehara | H04B 10/071 356/73.1 |
| 7,336,898 | B2 | 2/2008 | Fling et al. | |
| 7,388,657 | B2 * | 6/2008 | Abbott | H04B 10/071 356/73.1 |
| 7,872,738 | B2 * | 1/2011 | Abbott | H04B 10/071 356/73.1 |
| 8,477,411 | B2 | 7/2013 | Griseri et al. | |
| 8,564,876 | B2 | 10/2013 | Hiraizumi et al. | |
| 8,576,389 | B2 * | 11/2013 | Perron | G01M 11/3127 356/73.1 |
| 2002/0118442 | A1 | 8/2002 | Ghera et al. | |
| 2002/0140927 | A1 * | 10/2002 | Sobe | G01M 11/3145 356/73.1 |
| 2002/0154356 | A1 * | 10/2002 | Krummrich | H04B 10/503 398/94 |
| 2002/0159134 | A1 | 10/2002 | Ghera et al. | |
| 2003/0117692 | A1 * | 6/2003 | Tanaka | H01S 3/302 359/334 |
| 2004/0160664 | A1 * | 8/2004 | Sobe | G01M 11/3145 359/334 |
| 2005/0105167 | A1 | 5/2005 | Martinielli et al. | |
| 2007/0041006 | A1 * | 2/2007 | Abbott | H04B 10/071 356/73.1 |
| 2012/0020672 | A1 | 1/2012 | Aguren | |
| 2013/0038865 | A1 | 2/2013 | McClean | |
| 2013/0088718 | A1 * | 4/2013 | Perron | G01M 11/3127 356/445 |
| 2013/0272694 | A1 | 10/2013 | Sandstrom | |

OTHER PUBLICATIONS

D. Meshulach, O. Eyal, and R. Klein; "In-Situ time-gated method for fiber characterization and performance prediction of distributed Raman amplification"; (C) 2002—Optical Society of America.
"Optical Networks Having Optical Time Domain Reflectometers Embedded in Small Form Factor Pluggables," Lanier Ford.

* cited by examiner

RAMAN AMPLIFIER SYSTEM AND METHOD WITH INTEGRATED OPTICAL TIME DOMAIN REFLECTOMETER

CROSS-REFERENCE TO RELATED APPLICATIONS

The present patent/application is a continuation of U.S. patent application Ser. No. 14/845,351, filed Sep. 4, 2015, and entitled "RAMAN AMPLIFIER SYSTEM AND METHOD WITH INTEGRATED OPTICAL TIME DOMAIN REFLECTOMETER," which is a continuation of U.S. patent application Ser. No. 13/622,481, filed Sep. 19, 2012 (now U.S. Pat. No. 9,148,710 issued on Sep. 29, 2015), and entitled "RAMAN AMPLIFIER SYSTEM AND METHOD WITH INTEGRATED OPTICAL TIME DOMAIN REFLECTOMETER," the contents of each is incorporated by reference herein.

FIELD OF THE INVENTION

Generally, the field of art of the present disclosure pertains to fiber optic systems and methods, and more particularly, to Raman amplifier systems and methods with an integrated Optical Time Domain Reflectometer (OTDR) for integrated testing functionality.

BACKGROUND OF THE INVENTION

Conventionally, OTDRs inject a series of optical pulses into the fiber under test and extract, from the same end of the fiber, light that is scattered (i.e., Rayleigh backscatter) or reflected back from points along the fiber. Results from OTDRs are used for estimating the fiber's length, overall attenuation, and discontinuities along the fiber. Such information about the fiber under test is particularly relevant in the context of Raman amplifiers where Raman pumps input high-powered wavelengths in a co-propagated and/or counter-propagating manner in the fiber with information carrying wavelengths. That is, with high-powered wavelengths, it is desirable to know about fiber conditions particularly discontinuities and the like. Conventionally, there have been several attempts to integrate fiber testing functionality with Raman amplifiers. These conventional implementations can be characterized in two categories, namely 1) use of dedicated optical components or test equipment to provide the OTDR function within a Raman amplifier or 2) use one of the Raman pump lasers as the OTDR source. Disadvantageously, dedicated optical components lead to increased cost, power, and/or space requirements and use of one of the Raman pump lasers prevents in-service operation (i.e., no testing when the Raman pump lasers are in-service). Thus, relative to conventional systems and methods, there is a need to integrate OTDR functionality with optical amplifier systems and methods while minimizing cost, and a need to operate the OTDR functionality while the optical amplifier systems and methods are either out-of-service or in-service, and the like.

BRIEF SUMMARY OF THE INVENTION

In an exemplary embodiment, an optical module includes an optical amplifier configured to amplify Wavelength Division Multiplexing (WDM) channels transmitted on a fiber; and an optical time domain reflectometer (OTDR) configured to transmit an OTDR signal on the fiber and detect a back-scattered signal based thereon to test the fiber, wherein a wavelength of the OTDR signal is one of i) between one or more wavelengths associated with the optical amplifier and one or more wavelengths associated with the WDM channels and ii) greater than the one or more wavelengths associated with the WDM channels, for in-service operation of the OTDR. The wavelength of the OTDR signal can be between 1470 nm and 1527.5 nm, greater than 1567 nm, and/or substantially close to the one or more wavelengths associated with the WDM channels to experience similar gain from the optical amplifier. The optical amplifier can include a Raman amplifier, wherein the wavelength of the OTDR signal can experience gain when the Raman amplifier is on, and wherein the OTDR can operate with the Raman amplifier on and off to determine gain. The OTDR can include a tunable transmitter configured to transmit the wavelength of the OTDR signal at a plurality of wavelengths. The optical amplifier can include a Raman amplifier, wherein the tunable transmitter can be configured to tune the wavelength of the OTDR signal to a first wavelength which experiences gain from the Raman amplifier and tune the wavelength of the OTDR signal to a second wavelength which does not experience gain from the Raman amplifier, to determine a gain of the Raman amplifier in-service. The OTDR can include a configurable pulse generator for the OTDR signal which is adjusted to change an operating mode of the OTDR. The optical amplifier can include a Raman amplifier, and wherein the configurable pulse generator can be configured to set pulse width to detect back reflection close to the Raman amplifier.

In another exemplary embodiment, an optical amplifier module includes a Raman amplifier with one or more Raman pumps configured to transmit at Raman wavelengths on a fiber to amplify Wavelength Division Multiplexing (WDM) channels transmitted thereon; and an optical time domain reflectometer (OTDR) configured to transmit an OTDR signal on the fiber and detect a back-scattered signal based thereon to test the fiber, wherein a wavelength of the OTDR signal is one of i) between one or more wavelengths associated with the one or more Raman pumps and one or more wavelengths associated with the WDM channels and ii) greater than the one or more wavelengths associated with the WDM channels, for in-service operation of the OTDR. The wavelength of the OTDR signal can be between 1470 nm and 1527.5 nm, greater than 1567 nm, and/or substantially close to the one or more wavelengths associated with the WDM channels to experience similar gain from the optical amplifier. The wavelength of the OTDR signal can experience gain when the Raman amplifier is on, and wherein the OTDR operates with the Raman amplifier on and off to determine gain. The OTDR can include a tunable transmitter configured to transmit the wavelength of the OTDR signal at a plurality of wavelengths. The tunable transmitter can be configured to tune the wavelength of the OTDR signal to a first wavelength which experiences gain from the Raman amplifier and tune the wavelength of the OTDR signal to a second wavelength which does not experience gain from the Raman amplifier, to determine a gain of the Raman amplifier in-service. The OTDR can include a configurable pulse generator for the OTDR signal which is adjusted to change an operating mode of the OTDR. The configurable pulse generator can be configured to set pulse width to detect back reflection close to the Raman amplifier.

In a further exemplary embodiment, a method implemented by an optical module includes amplifying, by an optical amplifier, Wavelength Division Multiplexing (WDM) channels transmitted on a fiber; and transmitting an optical time domain reflectometer (OTDR) signal by an OTDR on the fiber, wherein the OTDR is integrated in the optical module with the optical amplifier; and detecting a back-scattered signal based on the OTDR signal to test the fiber, wherein a wavelength of the OTDR signal is one of i) between one or more wavelengths associated with the optical amplifier and one or more wavelengths associated with the WDM channels and ii) greater than the one or more wavelengths associated with the WDM channels, for in-service operation of the OTDR. The method can further include determining Raman gain of the optical amplifier based on comparing at least two detected back-scattered signals.

In an exemplary embodiment, a Raman amplifier module, with an integrated Optical Time Domain Reflectometer (OTDR), includes one or more Raman pumps, wherein the one or more Raman pumps are configured as a Raman amplifier; a subsystem comprising a transmitter, a receiver, and circuitry, wherein the subsystem is configured to selectively operate as an OTDR and a telemetry channel based on configuration of a switch optically coupled to the transmitter and configuration of the circuitry, wherein the circuitry is configured to use the telemetry channel to measure gain due to Raman amplification in a fiber based on measurements with the one or more Raman pumps on and off to provide an estimate of Raman gain and communicate data with an adjacent Raman amplifier module. A wavelength of the transmitter can be outside a range of wavelengths associated with the one or more Raman pumps, outside a range of wavelengths associated with Wavelength Division Multiplexed (WDM) channels, and different from a wavelength associated with an Optical Service Channel (OSC). Prior to activating the one or more Raman pumps, the OTDR can be configured to perform a test, wherein corrective actions are performed responsive to the test, wherein once the corrective actions are taken, the one or more Raman pumps are enabled and the subsystem is configured as the telemetry channel to continuously measure real-time Raman gain while concurrently providing a redundant Optical Service Channel (OSC) channel.

While the telemetry channel continuously measures the real-time Raman gain, responsive to detecting issues with the real-time gain, the subsystem can be configured to switch to the OTDR to perform in-service fiber plant testing for any corrective action based thereon. The Raman amplifier module can further include an Optical Service Channel (OSC) configured with the adjacent Raman amplifier module, wherein the data channel provides redundancy for the OSC. The Raman amplifier module can further include a circulator optically coupled to a first port of the switch, a second fiber which is optically coupled to the one or more Raman pumps, and the receiver; wherein, for the OTDR, the transmitter transmits via the circulator and the receiver receives a return signal via the circulator, and wherein, for the telemetry channel, the switch is set to a second port optically coupled to the fiber and the transmitter transmits separate from the circulator and the receiver receives a telemetry signal from the adjacent Raman amplifier module via the circulator. The switch can be configured to optically couple the transmitter to the fiber for the telemetry channel and to a second fiber for the OTDR, and wherein the one or more Raman pumps are optically coupled to the second fiber.

In another exemplary embodiment, an optical subsystem, configured in a Raman amplifier, includes a transmitter optically connected to a switch; a receiver; circuitry coupled to the transmitter and the receiver; and a circulator with a first port optically connected to the switch, a second port optically connected to a fiber, and a third port optically connected to the receiver, wherein the circuitry is configured to selectively operate as an Optical Time Domain Reflectometer (OTDR) and a telemetry channel based on configuration of the switch, transmitter, and the circuitry. A wavelength of the transmitter can be outside a range of wavelengths associated with one or more Raman pumps, outside a range of wavelengths associated with Wavelength Division Multiplexed (WDM) channels, and different from a wavelength associated with an Optical Service Channel (OSC). The OTDR can be configured to operate out-of-service and in-service relative to the Raman amplifier. The transmitter can have a wavelength which does not interfere with the Raman amplifier, but which experiences gain due to the Raman amplifier, wherein a difference in measurements by the OTDR out-of-service and in-service provides an estimate of Raman gain associated with the Raman amplifier.

Prior to activating the Raman amplifier, the OTDR can be configured to perform a test, wherein corrective actions are performed responsive to the test, wherein once the corrective actions are taken, the Raman amplifier is enabled and the optical subsystem is configured as the telemetry channel to continuously measure real-time Raman gain while concurrently providing a redundant Optical Service Channel (OSC) channel. While the telemetry channel continuously measures the real-time Raman gain, responsive to detecting issues with the real-time gain, the subsystem can be configured to switch to the OTDR to perform in-service fiber plant testing for any corrective action based thereon. The Raman amplifier can include an Optical Service Channel (OSC) configured to communicate with an adjacent Raman amplifier module, wherein the telemetry channel provides redundancy for the OSC. The switch can be configured to optically couple the transmitter to the fiber for the telemetry channel and to a second fiber for the OTDR, and wherein the one or more Raman pumps are optically coupled to the second fiber.

In a further exemplary embodiment, a Raman amplifier method, with an integrated Optical Time Domain Reflectometer (OTDR) in a Raman amplifier, includes providing one or more Raman pumps, wherein the one or more Raman pumps are configured as a Raman amplifier; providing a subsystem comprising a transmitter, a receiver, and circuitry, wherein the subsystem is configured to selectively operate as an OTDR and a telemetry channel based on configuration of a switch optically coupled to the transmitter and configuration of the circuitry; and using the circuitry with the telemetry channel to measure gain due to Raman amplification in a fiber based on measurements one or more Raman pumps on and off to provide an estimate of Raman gain and to provide a data channel to an adjacent Raman amplifier module. A wavelength of the transmitter can be outside a range of wavelengths associated with the one or more Raman pumps, outside a range of wavelengths associated with Wavelength Division Multiplexed (WDM) channels, and different from a wavelength associated with an Optical Service Channel (OSC). The OTDR can be configured to operate out-of-service and in-service where the one or more Raman pumps are operational.

In an exemplary embodiment, an amplifier system includes at least one pump laser coupled to a line in port; and an optical time domain reflectometer (OTDR) and telemetry subsystem selectively coupled to the line in port and a line out port, wherein the line out port is for a different fiber than the line in port, and wherein the OTDR and telemetry subsystem is configured to operate in an OTDR mode when coupled to the line in port and to operate in a telemetry mode when coupled to the line out port. In the OTDR mode, the transmitter can be configured to transmit optical pulses on the line in port and the receiver is configured to detect back reflections associated with the optical pulses from the line in port; and, in the telemetry mode, the transmitter can be configured to transmit a telemetry wavelength including data over the line out port to another node and the receiver is configured to receive the a telemetry wavelength including data over the line in port from the another node. The OTDR and telemetry subsystem can include a transmitter selectively coupled to the line in port and the line out port via an optical switch; and circuitry communicatively coupled to the transmitter and the receiver. The OTDR and telemetry subsystem can further include a receiver coupled to the line in port.

The OTDR and telemetry subsystem can include a transmitter providing an out-of-band counter-propagating OTDR signal in the OTDR mode and a co-propagating out-of-band telemetry channel in the telemetry mode. The transmitter can include a wavelength selected outside a range of the at least one pump laser and any wavelength division multiplexing (WDM) channels on the line in port and the line out port. The transmitter can include a tunable wavelength selected in a region where gain from the at least one pump laser is near zero. The receiver can include a bandwidth of between 40 kHz and 12 MHz selected for pulse lengths of approximately 10 ns to 100 us over the transmitter in the OTDR mode. In the OTDR mode, the circuitry can include a signal processing block; a pulse generator coupled to the signal processing block and to the transmitter; and a transimpedance amplifier coupled to the receiver and an analog-to-digital converter, wherein the analog-to-digital converter is coupled to the signal processing block. The signal processing block can be configured to provide back reflection data versus distance to a processor associated with the amplifier system, and wherein the circuitry can only interprets the back reflection data versus distance to detect an open connector and the processor interprets the back reflection data versus distance data to provide an OTDR trace based thereon. The OTDR mode can be configured to operate both while the at least one pump laser is off and while the at least one pump laser is on, and wherein a difference between OTDR traces when the at least one pump laser is off and when the at least one pump laser is on can be indicative of Raman gain. In the telemetry mode, the circuitry can be configured to provide a real-time measurement of Raman gain separate from any wavelength division multiplexing (WDM) channels; and provide a redundant safety shutdown mechanism.

In another exemplary embodiment, an optical module including an optical time domain reflectometer (OTDR) and telemetry subsystem includes a transmitter selectively coupled to a line in port of the optical module and a line out port of the optical module via an optical switch; a receiver coupled to the line in port; and circuitry communicatively coupled to the transmitter and the receiver; wherein the transmitter, the receiver, and the circuitry are configured to operate in an OTDR mode when coupled to the line in port and to operate in a telemetry mode when coupled to the line out port. The transmitter can provide an out-of-band counter-propagating OTDR signal in the OTDR mode and a co-propagating out-of-band telemetry channel in the telemetry mode. In the OTDR mode, the transmitter can be configured to transmit optical pulses on the line in port and the receiver is configured to detect back reflections associated with the optical pulses from the line in port; and, in the telemetry mode, the transmitter can be configured to transmit a telemetry wavelength including data over the line out port to another node and the receiver is configured to receive the a telemetry wavelength including data over the line in port from the another node.

The transmitter can include a wavelength selected outside a range of the at least one pump laser and any wavelength division multiplexing (WDM) channels on the line in port and the line out port. In the OTDR mode, the circuitry can include a signal processing block; a pulse generator coupled to the signal processing block and to the transmitter; and a transimpedance amplifier coupled to the receiver and an analog-to-digital converter, wherein the analog-to-digital converter is coupled to the signal processing block; wherein the signal processing block is configured to provide back reflection data versus distance to a processor associated with the amplifier system, and wherein the circuitry only interprets the back reflection data versus distance to detect an open connector and the processor interprets the back reflection data versus distance data to provide an OTDR trace based thereon. The OTDR mode can be configured to operate both while the at least one pump laser is off and while the at least one pump laser is on, and wherein a difference between OTDR traces when the at least one pump laser is off and when the at least one pump laser is on is indicative of Raman gain. In the telemetry mode, the circuitry can be configured to provide a real-time measurement of Raman gain separate from any wavelength division multiplexing (WDM) channels; and provide a redundant safety shutdown mechanism.

In yet another exemplary embodiment, a method includes installing and provisioning a Raman amplifier to associated fiber plant; performing a fiber plant test using an optical time domain reflectometer (OTDR) and telemetry subsystem disposed within the Raman amplifier, wherein the OTDR and telemetry subsystem is configured to operate in an OTDR mode when coupled to a first fiber and to operate in a telemetry mode when coupled to a second fiber; performing corrective actions on the first fiber responsive to the fiber plant test; turning up the Raman amplifier; and continuously monitoring Raman gain using the OTDR and telemetry subsystem.

BRIEF DESCRIPTION OF THE DRAWING(S)

Exemplary and non-limiting embodiments of the present disclosure are illustrated and described herein with reference to various drawings, in which like reference numbers denote like method steps and/or system components, respectively, and in which.

DETAILED DESCRIPTION OF THE INVENTION

In various exemplary embodiments, the present disclosure relates to Raman amplifier systems and methods with an integrated Optical Time Domain Reflectometer (OTDR) for integrated testing functionality. In operation, a Raman amplifier sends a very high amount of optical power (~0.5-1 W) into fiber plant to provide gain for the data-carrying optical channels. The OTDR allows the Raman amplifier to verify the integrity of the fiber plant, measuring critical parameters like insertion loss, propagation loss, and back reflections from optical connectors. This provides the capability to identify potential problems before the high-power Raman pumps are enabled and then to monitor the health of the fiber plant over time. Specifically, the Raman amplifier systems and methods minimize cost by sharing major optical and electrical components between the integrated OTDR and other functions on the Raman amplifier. Further, the Raman amplifier systems and methods provide a mechanism to operate the OTDR both out-of-service (during system provisioning) and in-service (while the system is carrying live traffic). Also, the Raman systems and methods can use the OTDR information to estimate Raman gain and to track changes in the fiber plant over time.

Figure 1:
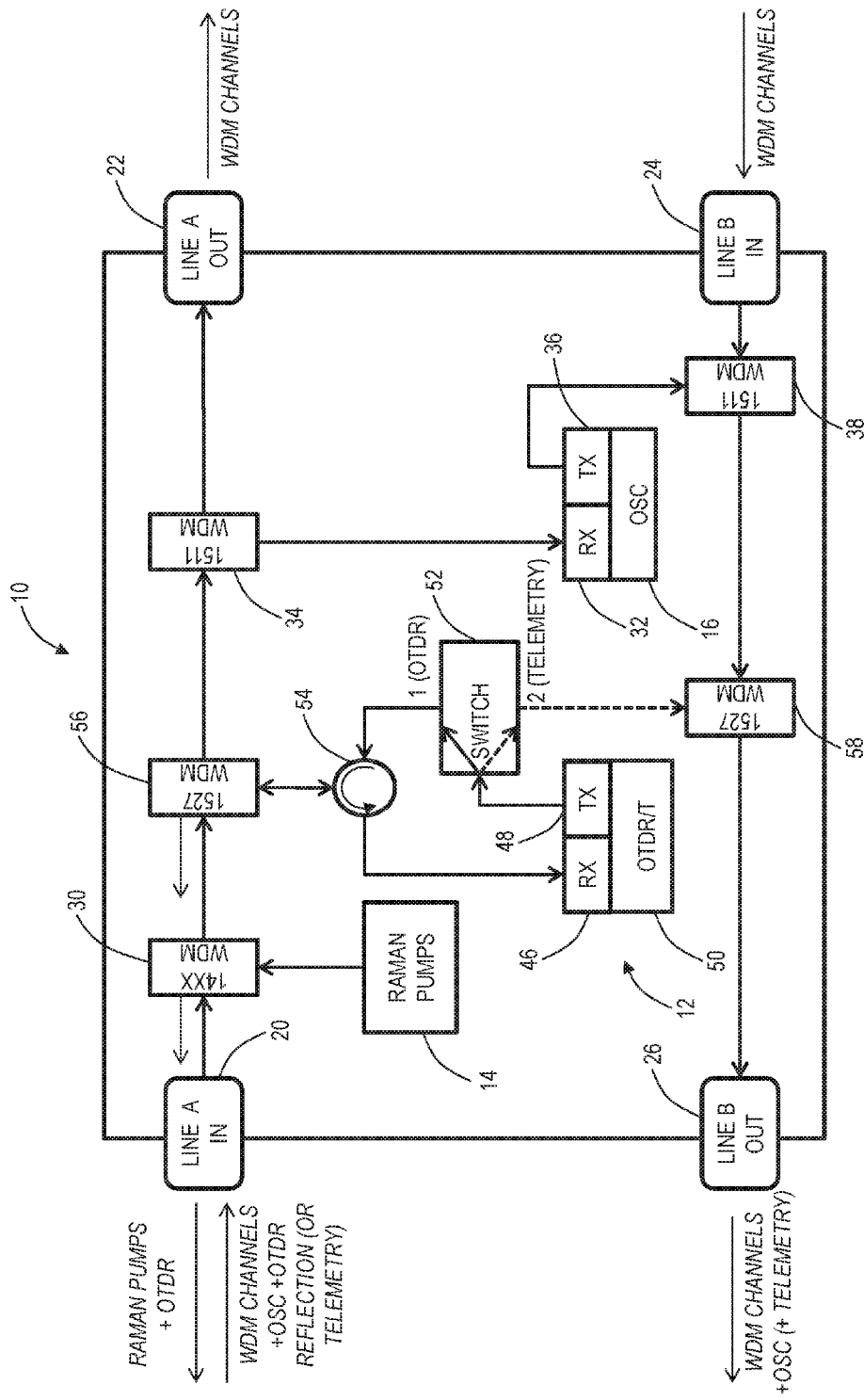
FIG. 1 is a block diagram of a Raman amplifier with an integrated OTDR/telemetry subsystem.

Referring to FIG. 1, in an exemplary embodiment, a block diagram illustrates a Raman amplifier 10 with an integrated OTDR/telemetry subsystem 12. Functionally, the Raman amplifier 10 includes three subsystems, namely the OTDR/telemetry subsystem 12, Raman pumps 14, and an Optical Service Channel (OSC) 16. The Raman amplifier 10 is a two-fiber device meaning the Raman amplifier 10 supports two fibers, line A and line B, with a line A in port 20, a line A out port 22, a line B in port 24, and a line B out port 26. In the exemplary configuration of FIG. 1, the Raman amplifier 10 is counter-pumping line A and monitoring line B. That is, the ports 20, 26 are facing outside fiber plant, and the ports 22, 24 are facing internally in a node (i.e., to other components such as erbium doped fiber amplifier (EDFA) amplifiers, add/drop multiplexers, wavelength selective switches, transceivers, etc.). The Raman pumps 14 include one or more high-powered lasers at various Raman wavelengths (e.g., 1420-1465 nm, 1424/1434 nm, 1455/1465 nm, etc.). These lasers are added to the line A via a 14XX wavelength division multiplexing (WDM) filter 30 that is configured to add wavelengths in the 14XX range to the line A which can include information-carrying wavelengths in the 15XX range.

The Raman pumps 14 can include Raman pump lasers, optical depolarization and multiplexing, control circuitry, and sensors to enable Raman pumping. In an exemplary embodiment, a baseline pump design can include a plurality of 14XX nm pump wavelengths with total optical powers of about 1.0 W. The OSC 16 includes a receiver (RX) 32 that is coupled off the line A via a 1511 nm WDM filter 34 and a transmitter (TX) 36 that is added to the line B via a 1511 nm WDM filter 38. In this exemplary embodiment, the OSC 16 is at 1511 nm although other wavelengths are also contemplated. The OSC provides a communication channel between nodes for operations, administration, maintenance, and provisioning (OAM&P) functionality.

In the Raman amplifier 10, the OTDR/telemetry subsystem 12 has dual functionality of being an OTDR and a telemetry channel. The OTDR/telemetry subsystem 12 includes a receiver (RX) 46, a transmitter (TX) 48, and circuitry 50. The receiver 46, transmitter 48, and circuitry 50 are shared between OTDR and telemetry functions. An optical switch 52 is used to select one of the two modes of operation, OTDR and telemetry. In an OTDR mode, the optical switch 52 is set to a first position coupling the transmitter 48 to an optical circulator 54. The optical circulator 54 connects to a 1527 nm WDM filter 56 (e.g., the transmitter 48 can be at 1527 nm although other wavelengths are also contemplated). In an exemplary embodiment, the optical circulator 54 can be replaced with a coupler. For example, a coupler could have additional insertion loss (e.g., 6 dB instead of 2 dB for the optical circulator 54) which would reduce the dynamic range of the OTDR, but would be cost reduced. The WDM filter 56 couples the transmitter 48 to the line A. Also, the WDM filter 56 couples the line A to the receiver 46 for back reflection detection. In the OTDR mode, the circuitry 50 is configured to transmit an OTDR pulse via the transmitter 48 that is launched backward in the line A into the port 20, i.e., the OTDR pulse is counter-propagating relative to any WDM channels on line A. The Raman pumps 14, when active, are launched in the same direction as the OTDR pulse. The OTDR pulse produces a back-scattered signal, which reflects back into the port 20 entering the Raman amplifier 10 in the forward direction. The optical circulator 54 then directs the back-scattered signal into the receiver 46, where it is digitized and analyzed by the circuitry 50 or other devices such as a shelf processor.

In telemetry mode, the optical switch 52 is set to a second position coupling the transmitter 48 to the port 26, where a telemetry signal from the transmitter 48 co-propagates with WDM channels in that line B fiber. With the optical switch 52 in the second position, the transmitter 48 is inserted into the line B via a 1527 nm WDM filter 58. In this mode, the port 26 allows the Raman amplifier 10 to communicate or signal to another Raman amplifier 10 provisioned at an upstream node in a fiber optic system. That upstream Raman amplifier 10 can communicate back to the Raman amplifier 10 by sending a signal at a similar wavelength into the line A port 20, where it is split off via the WDM filter 56 and the optical circulator 54 to the receiver 46. Thus with the use of the optical switch 52 and the optical circulator 54, the receiver 46 and the transmitter 48 can be shared between the OTDR and telemetry applications.

Thus, OTDR/telemetry subsystem 12 can be an out-of-band counter-propagating OTDR or a co-propagating out-of-band telemetry channel used to actively measure the Raman gain. Both of these signals are near 1527 nm, i.e., both these signals are the same wavelength based on sharing the transmitter 48. The OTDR functionality can be used during test and turn up to ensure the fiber span and connectors meet necessary requirements for activating the Raman pumps 14. The telemetry functionality is used to actively measure the Raman gain during normal operation. During normal operation, the OTDR functionality can be remotely enabled via software to switch the optical switch 52 to also enable on-demand OTDR testing in-service. Note, the circuitry 50 is configured to function as an OTDR, i.e., transmitting pulses and measuring back-scatter, and as a telemetry channel, i.e., transmitted modulated data and receiving the same. The circuitry 50 is also communicatively coupled to a node controller, shelf processor, etc. for conveying data from the OTDR/telemetry subsystem 12. For example, in the OTDR mode, the circuitry 50 can deliver calibrated back reflection data versus distance to the shelf processor via standard intra-shelf communications protocols. Also, the OTDR/telemetry subsystem 12 can be commanded into the OTDR mode of the telemetry mode by the shelf processor.

The OTDR/telemetry subsystem 12 can perform several functions in the telemetry mode. First, the transmitter 48 provides a real time measurement of the Raman gain separate from any WDM channels. This may be used for long term monitoring of the health of the fiber plant and Raman amplifier 10, and may also be used for relatively rapid real time control. The telemetry channel also works in parallel with the OSC 16 and other sensors to provide robust and redundant fault monitoring. That is, the telemetry mode of the OTDR/telemetry subsystem 12 provides a second OSC channel for redundancy. In some cases, Raman amplification must be used on very high loss span that exceeds the OSC link budget (e.g., festoon or channel crossings), and in these cases, an optical sensor redundant to the OSC channel is needed to provide for acceptable fault management and eye safety protocols. The telemetry channel provides a redundant safety mechanism, meaning that the Raman amplifier 10 is able to distinguish between a fiber cut (affects the OTDR/telemetry subsystem 12 and the OSC 16) and an OSC failure (affects the OSC 16 only). The telemetry channel can also be used to communicate between nodes, but at a much lower data rate compared to the OSC 16.

Figure 2:
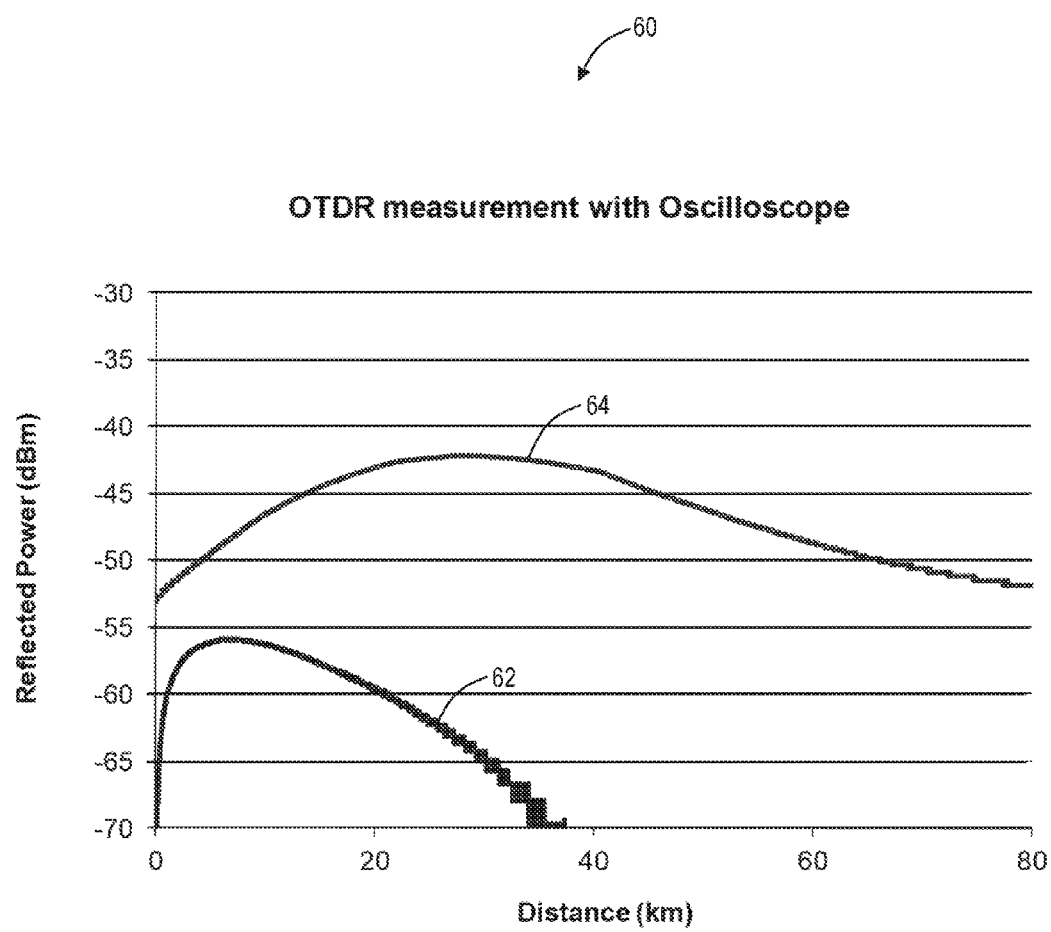
FIG. 2 is a graph of an exemplary OTDR trace using the Raman amplifier of FIG. 1 and the OTDR/telemetry subsystem.

In an exemplary embodiment of the Raman amplifier 10, the wavelength that has been selected for the transmitter 48 in the OTDR/telemetry subsystem 12 is 1527 nm. This enables this signal to coexist with the Raman pumps (e.g., 1420-1470 nm) and WDM channels (e.g., 1527.5-1567 nm) without interference. Any wavelength between the Raman pump wavelengths and the WDM channel wavelengths can be used. In particular, this makes it possible for the OTDR to be used in-service, i.e., while the WDM channels are active. In the absence of the Raman pump, the OTDR provides a measure of the propagation and interconnection losses in the fiber plant. Referring to FIG. 2, in an exemplary embodiment, a graph illustrates an exemplary OTDR trace 60 using the Raman amplifier 10 and the OTDR/telemetry subsystem 12. The OTDR trace 60 includes two traces 62, 64, an OTDR trace 62 with Raman pumps off and an OTDR trace 64 with Raman pumps on. With the Raman pumps enabled, the 1527 nm OTDR pulse experiences gain as it propagates down the fiber, which affects the OTDR trace as shown in the OTDR trace 64. By comparing these two traces 62, 64, it is possible to estimate the Raman gain in the fiber after the pumps are turned on. Then by measuring the OTDR trace periodically, one can monitor the health of the system as changes in fiber loss or Raman gain create a corresponding change in the OTDR traces 62, 64. This can provide a powerful new diagnostic tool for network operators.

In another exemplary embodiment, the transmitter 48 can be tunable allowing for different OTDR wavelengths (and telemetry wavelengths). Alternatively, the transmitter 48 can include separate transmitters contained therein at different wavelengths. This can be used to monitor Raman gain and fiber loss separately. By switching the OTDR wavelength to a region where the Raman gain is near zero (e.g., 1610 nm), fiber losses could be measured accurately in-service via an OTDR measurement, independently of the Raman gain. With a tunable wavelength implementation of the transmitter 48, there could be a potential to measure the Raman gain within the WDM signal band as well in-service, by tuning the OTDR wavelength to any unused WDM channels. Also, this exemplary embodiment requires the WDM filter 56 be tunable as well to track the wavelength tuning of the transmitter 48.

As described herein, the OTDR/telemetry subsystem 12 is embedded into the Raman amplifier 10. Note, the Raman amplifier 10 can be realized as a module, circuit pack, line card, "pizza box", subsystem, and the like for operation in a larger, WDM system. Also, the OTDR/telemetry subsystem 12 contemplates operation in other modules besides the Raman amplifier 10, such as an erbium doped fiber amplifier (EDFA) module, an OSC module, etc. The OTDR function of the OTDR/telemetry subsystem 12 generates calibrated back reflection versus distance data files that can be used by a shelf processor. In an exemplary embodiment, the OTDR function in the amplifier pack does not interpret the traces, except if the connector back-reflection is so large that it represents an open connector, in which case the Raman amplifier 10 will not turn on. The shelf processor, which can include general purpose and/or special purpose processing logic, can be used to perform the data analysis of the data files thereby removing processing complexity from the OTDR/telemetry subsystem 12.

Advantageously, the OTDR function ensures that connectors have a sufficiently low loss and low back reflection so that the Raman amplifier 10 operates properly and connectors will not be damaged at ~1 W Raman pump levels. Experimental work indicates that back reflection of less than −45 dB results in a robust and resilient connectors that will not be damaged by optical power, and minimizes and multi-path interference (MPI) effects that could degrade system performance. In an exemplary embodiment, the OTDR is able to accurately measure a −45 dB back-reflection within 0-1000 meters of the Raman amplifier 10 with a signal-to-noise ratio, SNR>10 dB. The OTDR function is also able to resolve back reflections from local connectors. For example, local connectors generally include connectors in the same location as the Raman amplifier 10 such as on a front panel on the Raman amplifier 10, at fiber distribution frames, etc. These connectors can be spaced as close as 2-3 meters apart from each other in practice.

Figure 3:
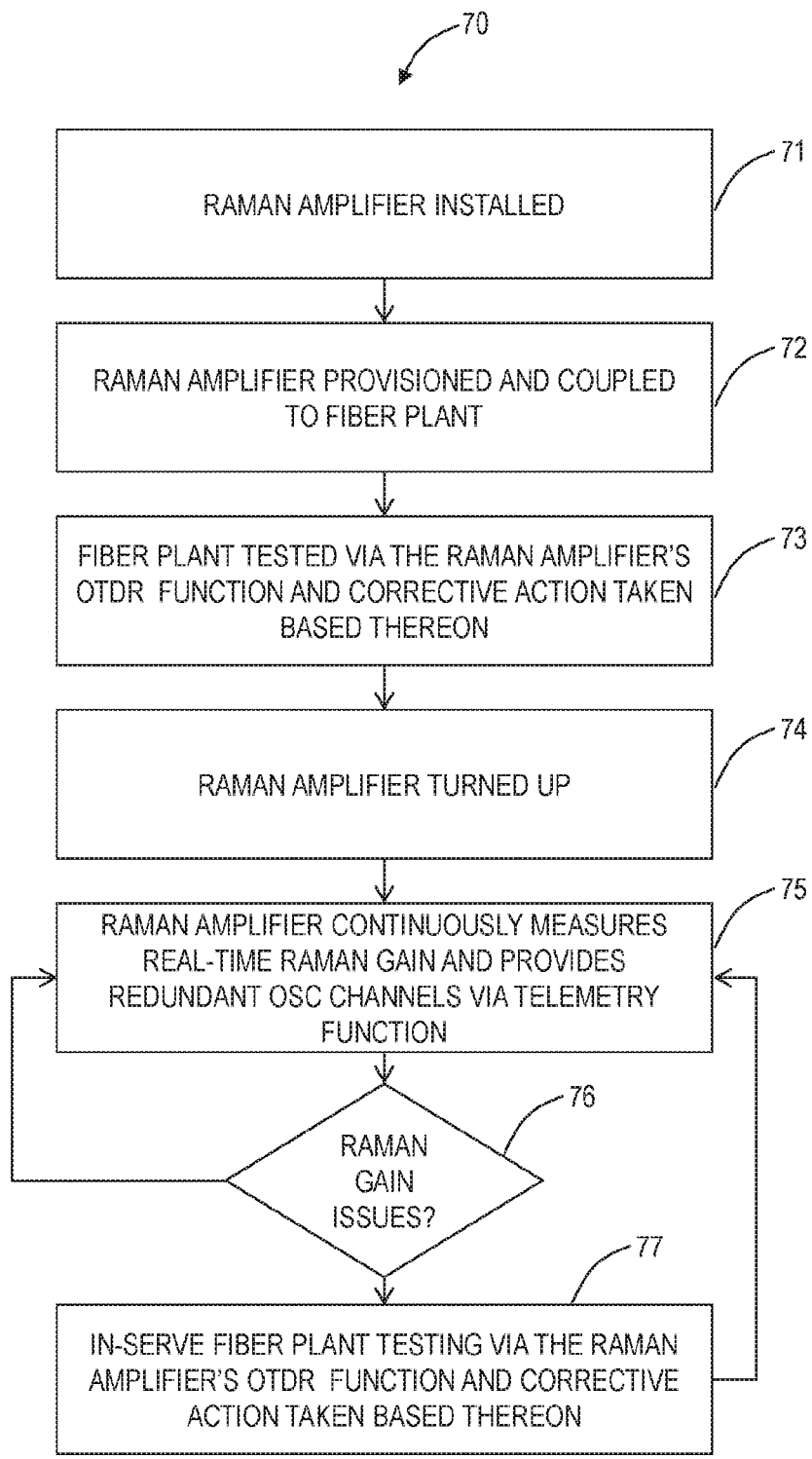
FIG. 3 is a flowchart of an operational method provisioning, testing, turning up, and operating the Raman amplifier of FIG. 1.

Referring to FIG. 3, in an exemplary embodiment, a flowchart illustrates an operational method 70 provisioning, testing, turning up, and operating the Raman amplifier 10. Advantageously, the Raman amplifier 10 provides an integrated system enabling automated provisioning, test, and turn up capabilities to minimize complexities faced by a service provider as well as in-service monitoring over time. The operational method 70 provides an exemplary use of the Raman amplifier 10 in an optical network. First, the Raman amplifier 10 is installed (step 71). That is, the Raman amplifier 10 is physically placed in a system, shelf, frame, etc. and provided power, etc. The Raman amplifier 10 is provisioned and coupled to fiber plant (step 72). Prior to activating the Raman pumps 14, the fiber plant is tested via the OTDR function of the Raman amplifier 10, and any corrective action is taken based thereon (step 73). For example, many real-world problems with Raman amplifiers occur due to non-ideal conditions associated with the inside and outside plant fiber such as connector losses, excess bend losses in conduits, unanticipated outside plant fiber loss or point losses, and improperly characterized fiber type. Subsequent to the test, corrective action can be taken to improve any problems. The integrated OTDR can be used to eliminate nearly all of the uncertainty that may exist when deploying Raman amplifiers, permitting nearly autonomous provisioning, test and turn up capabilities.

Once corrective actions are taken (if any), the Raman amplifier 10 can be turned up enabling the Raman pumps 14 (step 74). Here, the Raman amplifier 10 can switch from the OTDR functionality of the OTDR/telemetry subsystem 12 to the telemetry functionality. The Raman amplifier 10 can continuously measure real-time Raman gain while concurrently providing a redundant OSC channel via the telemetry functionality (step 75). During the continuous measurement, if there are Raman gain issues or periodically (step 76), the Raman amplifier 10 can switch from the telemetry functionality to the OTDR functionality and perform in-service fiber plant testing and take any corrective action based thereon (step 77).

Figure 4:
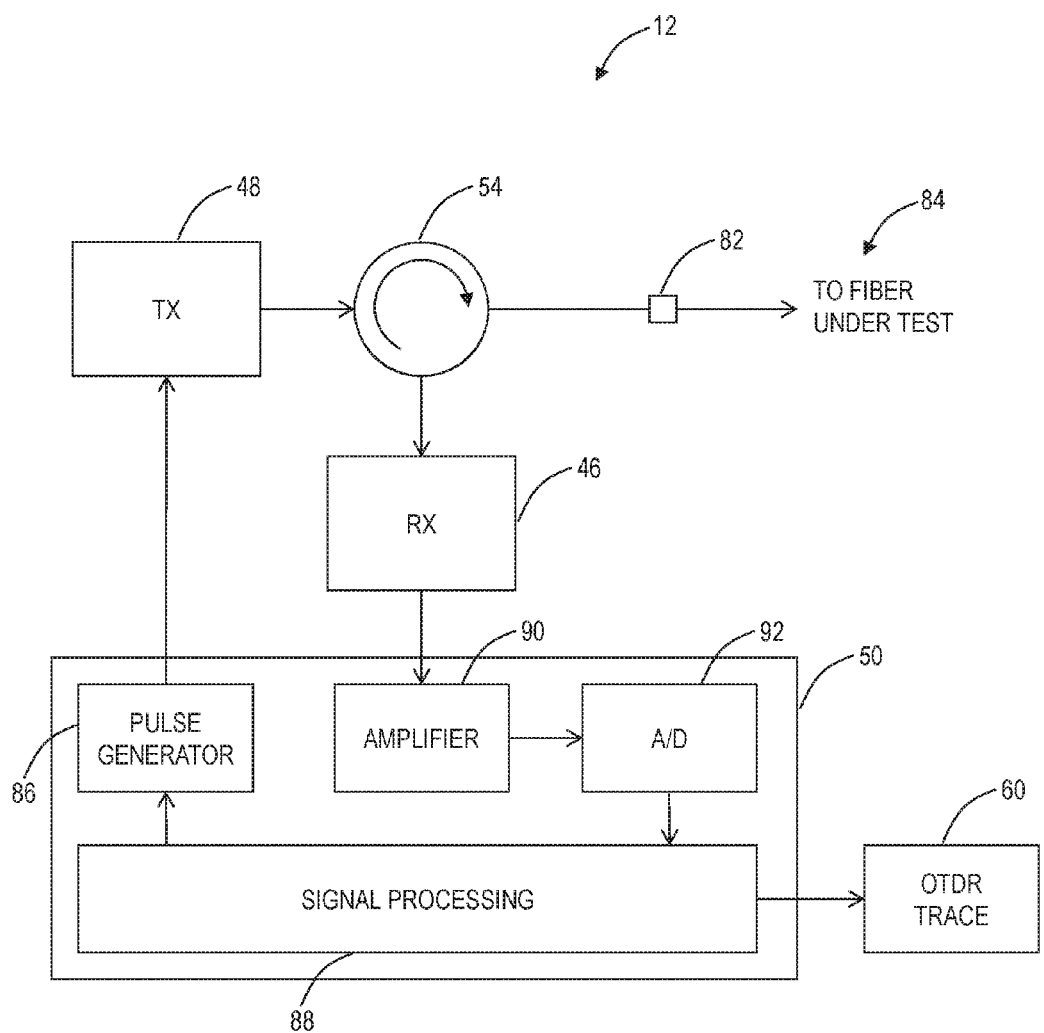
FIG. 4 is a functional block diagram of the OTDR/telemetry subsystem in the OTDR mode for the Raman amplifier of FIG. 1.

Referring to FIG. 4, in an exemplary embodiment, a functional block diagram illustrates the OTDR/telemetry subsystem 12 in the OTDR mode. FIG. 4 illustrates only components in the Raman amplifier 10 participating in the OTDR mode. Specifically, the optical circulator 54 has a port coupled to a fiber connector 82 that ultimately connects to fiber under test (FUT) 84. Note, the optical circulator 54 can also be a directional coupler or any other three-port device that enables both the transmitter 48 and the receiver 46 to connect to the FUT 84. FIG. 4 also includes additional details in the circuitry 50 related to the OTDR mode. On the transmitter 48 side, the circuitry 50 includes a pulse generator 86 connected to a signal processing block 88. Collectively, the pulse generator 86 and the signal processing block 88 are configured to generate specific length pulses to drive/modulate the transmitter 48. Note, the pulse length for the transmitter 48 correlates to how much bandwidth is required in the receiver 46. Without reflections in the FUT 84, different pulse widths will achieve similar OTDR slope or fiber loss profile, but one purpose of the ODTR is to measure possible back reflection and location. This requires a short pulse.

It has been determined that a pulse width of between 10 ns and 100 us is acceptable. Preferably, shorter pulses (e.g., about 10 ns for the transmitter 48) are used for measuring the first few km's of the FUT 84. For longer distances (e.g., 100 km), much longer pulses can be used such as 10 us and the like. In this case, the bandwidth of the receiver can be reduced considerably to less than 100 kHz. For example, the Raman amplifier 10 is most concerned about back reflection close to the port 20 as this is where there are safety and equipment concerns with high-powered lasers. That is, the OTDR mode of the OTDR/telemetry subsystem 12 is primarily concerned with detecting fiber related issues impairing Raman operation. In an exemplary embodiment, the OTDR mode is configured to measure about 4% back reflection within about the first 30 km of the FUT 84 using a 10 ns pulse. For a 10 ns pulse, ideally, 100 MHz bandwidth is required on the receiver 46 although this can be reduced for cost reduction without significant impact in performance to about 15 MHz. In an exemplary embodiment, the receiver 46 bandwidth can vary from 40 kHz to 12 MHz, and the pulse length can vary from 10 ns to 100 us.

On the receive side, the receiver 46 connects to an amplifier 90 which connects to an analog-to-digital (A/D) device 92 that connects to the signal processing block 88. Note, the circuitry 50 includes both digital and analog components. The signal processing block 88 can be all-digital. The amplifier 90 can be integrated with the receiver 46 or in the circuitry 50, and the amplifier 90 is configured to amplify current from the receiver 46 and to provide the amplified current to the A/D device 92 for digitization. The amplifier 90 can include a transimpedance amplifier (TIA). As described above, the receiver 46 can have a bandwidth of between 15-100 MHz (preferably 15 MHz) with a dynamic range of at least 58-73 dB (0 km~30 km with a 10 ns pulse). In an exemplary embodiment, the receiver 46 can be an avalanche photodiode (APD) receiver.

In addition to detecting back reflection within about the first 30 km, the OTDR function can be able to determine transmission fiber loss over ~100 km so that loss profiles can be compared to stored or previously obtained values. This can require a different operating mode (different pulse width, repetition rate, etc.) that the mode used to measure and resolve connector back reflections. In this exemplary embodiment, the pulse generator 86 and the signal processing block 88 are configurable to adjust the operating mode.

The OTDR function can also be available after a fiber cut and repair to repeat the provisioning, test and turn up process. Manual operation can be available during the fiber cut event so that service provider personnel can use the OTDR to locate the fiber cut. Also, as described herein, the OTDR wavelength should be out of the signal band, to permit low loss multiplexing into the transmission fiber.

Figure 5:
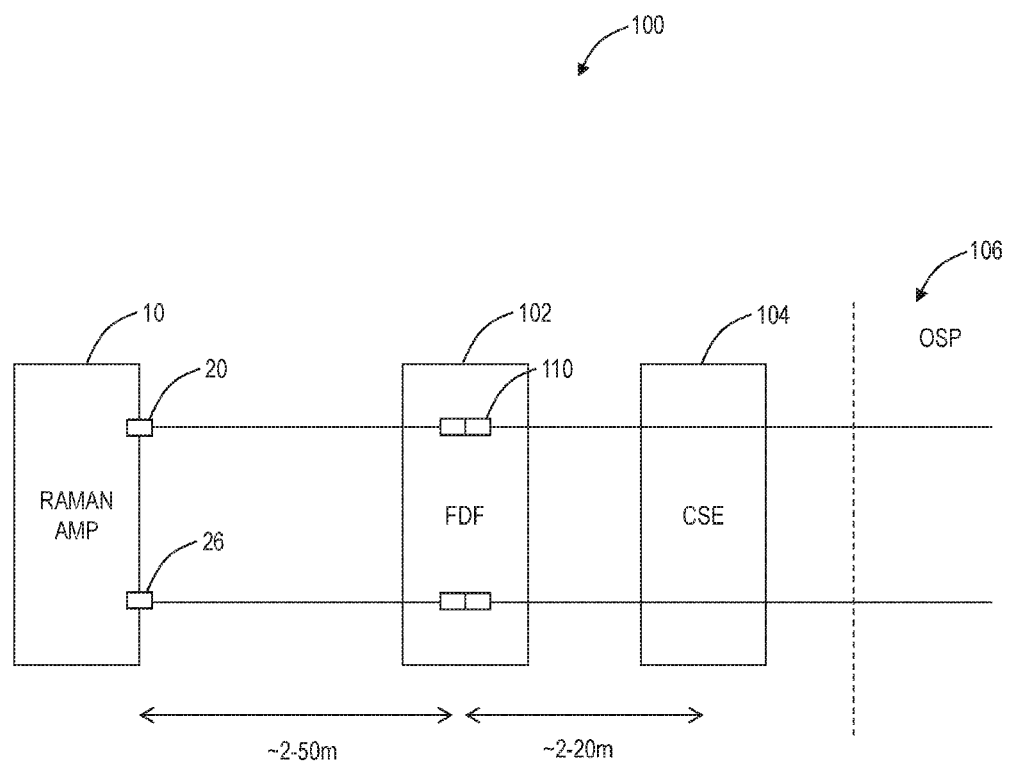
FIG. 5 is a block diagram of an exemplary implementation in a system of the Raman amplifier of FIG. 1.

Referring to FIG. 5, in an exemplary embodiment, a block diagram illustrates an exemplary implementation in a system 100 of the Raman amplifier 10. The system 100 can include a point-of-presence (POP) or a line amplifier (LA) site with the Raman amplifier 10 operating in a WDM network element. The POP/LA site can include various fiber-related components such as a fiber distribution frame (FDF) 102 and other equipment such as communication support equipment (CSE) 104. The POP/LA site has fiber that goes out to outside plant (OSP) 106. As those of ordinary skill in the art will recognize, there can be numerous connectors in the POP/LA site that are extremely close to the Raman amplifier 10, and its high-powered Raman pumps 14. For example, the ports 20, 26 can have connectors, and the FDF 102 can have various connectors 110 as well. The connectors can be SC (standard connectors), LC (little connectors), FC (fiber connectors), etc. Importantly, the OTDR function needs to resolve connector problems inside the POP/LA site to ensure good connectors (i.e., less than −45 dB back reflection) in order for the Raman amplifier 10 to turn on. Minimum distances can be as small as 2 m between the Raman amplifier 10 and the FDF 102. This resolution inside the POP/LA site sets the lower bound on the OTDR pulse width and detection requirements, i.e., need to be able to measure pulse height of −45 dB back reflection.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure and are intended to be covered by the following claims.

What is claimed is:

1. An optical module, comprising:
    an optical amplifier contained in the optical module and configured to amplify Wavelength Division Multiplexing (WDM) channels transmitted on a fiber; and
    an optical time domain reflectometer (OTDR) contained in the optical module and configured to transmit an OTDR signal on the fiber and detect a back-scattered signal based thereon to test the fiber,
    wherein a wavelength of the OTDR signal is one of i) between one or more wavelengths associated with the optical amplifier and one or more wavelengths associated with the WDM channels and ii) greater than the one or more wavelengths associated with the WDM channels, for in-service operation of the OTDR,
    wherein the optical amplifier comprises a Raman amplifier, wherein the wavelength of the OTDR signal experiences gain when the Raman amplifier is on, and wherein the OTDR operates with the Raman amplifier on and off to determine gain.

2. The optical module of claim 1, wherein the wavelength of the OTDR signal is between 1470 nm and 1527.5 nm.

3. The optical module of claim 1, wherein the wavelength of the OTDR signal is greater than 1567 nm.

4. The optical module of claim 1, wherein the wavelength of the OTDR signal is substantially close to the one or more wavelengths associated with the WDM channels to experience similar gain from the optical amplifier.

5. The optical module of claim 1, wherein the OTDR comprises a tunable transmitter configured to transmit the wavelength of the OTDR signal at a plurality of wavelengths.

6. The optical module of claim 5, wherein the optical amplifier comprises a Raman amplifier, wherein the tunable transmitter is configured to tune the wavelength of the OTDR signal to a first wavelength which experiences gain from the Raman amplifier and tune the wavelength of the OTDR signal to a second wavelength which does not experience gain from the Raman amplifier, to determine a gain of the Raman amplifier in-service.

7. The optical module of claim 1, wherein the OTDR comprises a configurable pulse generator for the OTDR signal which is adjusted to change an operating mode of the OTDR.

8. The optical module of claim 7, wherein the optical amplifier comprises a Raman amplifier, and wherein the configurable pulse generator is configured to set pulse width to detect back reflection close to the Raman amplifier.

9. An optical amplifier module, comprising:
    a Raman amplifier with one or more Raman pumps contained in the optical amplifier module and configured to transmit at Raman wavelengths on a fiber to amplify Wavelength Division Multiplexing (WDM) channels transmitted thereon; and
    an optical time domain reflectometer (OTDR) contained in the optical amplifier module and configured to transmit an OTDR signal on the fiber and detect a back-scattered signal based thereon to test the fiber,
    wherein a wavelength of the OTDR signal is one of i) between one or more wavelengths associated with the one or more Raman pumps and one or more wavelengths associated with the WDM channels and ii) greater than the one or more wavelengths associated with the WDM channels, for in-service operation of the OTDR,
    wherein the wavelength of the OTDR signal experiences gain when the Raman amplifier is on, and wherein the OTDR operates with the Raman amplifier on and off to determine gain.

10. The optical amplifier module of claim 9, wherein the wavelength of the OTDR signal is between 1470 nm and 1527.5 nm.

11. The optical amplifier module of claim 9, wherein the wavelength of the OTDR signal is greater than 1567 nm.

12. The optical amplifier module of claim 9, wherein the wavelength of the OTDR signal is substantially close to the one or more wavelengths associated with the WDM channels to experience similar gain from the optical amplifier.

13. The optical amplifier module of claim 9, wherein the OTDR comprises a tunable transmitter configured to transmit the wavelength of the OTDR signal at a plurality of wavelengths.

14. The optical amplifier module of claim 13, wherein the tunable transmitter is configured to tune the wavelength of the OTDR signal to a first wavelength which experiences gain from the Raman amplifier and tune the wavelength of the OTDR signal to a second wavelength which does not experience gain from the Raman amplifier, to determine a gain of the Raman amplifier in-service.

15. The optical amplifier module of claim 9, wherein the OTDR comprises a configurable pulse generator for the OTDR signal which is adjusted to change an operating mode of the OTDR.

16. The optical amplifier module of claim 15, wherein the configurable pulse generator is configured to set pulse width to detect back reflection close to the Raman amplifier.

17. A method implemented by an optical module, comprising:
    amplifying, by an optical amplifier in the optical module, Wavelength Division Multiplexing (WDM) channels transmitted on a fiber;
    transmitting an optical time domain reflectometer (OTDR) signal by an OTDR in the optical module on the fiber, wherein the OTDR is integrated in the optical module with the optical amplifier, wherein the transmitting is performed both with and without the amplifying;
    detecting a back-scattered signal based on the OTDR signal to test the fiber for the transmitting performed both with and without the amplifying; and
    determining Raman gain of the optical amplifier based on comparing at least two detected back-scattered signals with and without the amplifying,
    wherein a wavelength of the OTDR signal is one of i) between one or more wavelengths associated with the optical amplifier and one or more wavelengths associated with the WDM channels and ii) greater than the one or more wavelengths associated with the WDM channels, for in-service operation of the OTDR.

* * * * *